(12) United States Patent
Jeon et al.

(10) Patent No.: US 11,752,461 B2
(45) Date of Patent: Sep. 12, 2023

(54) AIR PURIFIER AND AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jongkeon Jeon, Seoul (KR); Haeyoong Chung, Seoul (KR); Jiyoung Kang, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

(*) Notice: Subject to any disclaimer, the term of this patent is extended or adjusted under 35 U.S.C. 154(b) by 664 days.

(21) Appl. No.: 16/818,096

(22) Filed: Mar. 13, 2020

(65) Prior Publication Data
US 2020/0298161 A1    Sep. 24, 2020

(30) Foreign Application Priority Data

Mar. 19, 2019 (KR) .................. 10-2019-0031460
Jul. 29, 2019 (KR) .................. 10-2019-0091560

(51) Int. Cl.
*B01D 46/00* (2022.01)
*B01D 46/12* (2022.01)
*F24F 8/10* (2021.01)

(52) U.S. Cl.
CPC ..... *B01D 46/0008* (2013.01); *B01D 46/0047* (2013.01); *B01D 46/12* (2013.01);
(Continued)

(58) Field of Classification Search
CPC ............ B01D 46/0008; B01D 46/0047; B01D 46/12; B01D 2247/12; B01D 2265/02; F24F 8/10
(Continued)

(56) References Cited

U.S. PATENT DOCUMENTS 4,416,775 A * 11/1983 Halbich ............... B01D 35/303
                                                                    D23/209
6,001,145 A * 12/1999 Hammes .................. A61L 9/16
                                                                    55/471
(Continued)

FOREIGN PATENT DOCUMENTS

CN    1510348    7/2004
CN    1651827    8/2005
(Continued)

OTHER PUBLICATIONS

United States Office Action dated May 6, 2022 issued in co-pending related U.S. Appl. No. 16/818,180.
(Continued)

*Primary Examiner* — Robert A Hopkins
*Assistant Examiner* — Qianping He
(74) *Attorney, Agent, or Firm* — KED & ASSOCIATES, LLP

(57) ABSTRACT

An air purifying system may include at least three air cleaners or purifiers capable of independently operating and a docking station to support the at least three air purifiers. Since the air purifiers may be separated or stacked together on the docking station, the air purifying system may be operated in various states desired by a user.

11 Claims, 11 Drawing Sheets

(52) U.S. Cl.
CPC ............ *F24F 8/10* (2021.01); *B01D 2247/12* (2013.01); *B01D 2265/02* (2013.01)

(58) Field of Classification Search
USPC ......................................................... 55/482
See application file for complete search history.

(56) References Cited

U.S. PATENT DOCUMENTS

| | | |
|---|---|---|
| 7,419,533 B2 | 9/2008 | Son et al. |
| 10,302,321 B2 | 5/2019 | Sakai et al. |
| 2004/0118288 A1 | 6/2004 | Kim et al. |
| 2005/0172816 A1* | 8/2005 | Son .................. B01D 46/0013 96/417 |
| 2005/0268583 A1 | 12/2005 | Han et al. |
| 2006/0107834 A1 | 5/2006 | Vandenbelt |
| 2006/0162300 A1 | 7/2006 | Sharifi |
| 2006/0277875 A1 | 12/2006 | Schuld |
| 2017/0248153 A1* | 8/2017 | Park ........................ F01P 7/167 |
| 2019/0160411 A1 | 5/2019 | Chu |

FOREIGN PATENT DOCUMENTS

| | | |
|---|---|---|
| CN | 1752617 | 3/2006 |
| CN | 104822999 | 8/2015 |
| CN | 105091105 | 11/2015 |
| CN | 105823135 | 8/2016 |
| CN | 106813315 | 6/2017 |
| CN | 107023885 | 8/2017 |
| CN | 108662711 | 10/2018 |
| EP | 1 433 516 | 6/2004 |
| KR | 10-2006-0026319 | 3/2006 |
| KR | 10-2016-0077888 | 7/2016 |
| WO | WO 2004/014521 | 2/2004 |
| WO | WO 2017/026761 | 2/2017 |
| WO | WO 2017/142026 | 8/2017 |

OTHER PUBLICATIONS

European Office Action dated Apr. 14, 2022 issued in EP Application No. 20163888.9.
U.S. Notice of Allowance dated Oct. 14, 2022 issued in U.S. Appl. No. 16/819,368.
Chinese Office Action dated Dec. 9, 2021 issued in Application No. 202010118631.9.
European Search Report dated Aug. 25, 2020 issued in Application No. 20161011.0.
Chinese Office Action dated Jun. 11, 2021 issued in CN Application No. 202010118631.9.
Chinese Office Action dated Jun. 24, 2021 issued in Application No. 202010181669.0.
U.S. Appl. No. 16/818,096, filed Mar. 13, 2020.
U.S. Appl. No. 16/818,180, filed Mar. 13, 2020.
U.S. Appl. No. 16/819,368, filed Mar. 16, 2020.
European Search Report dated Aug. 10, 2020 issued in Application No. 20160848.6.
European Search Report dated Aug. 12, 2020 issued in Application No. 20163888.9.
Chinese Office Action issued in Application No. 2021102903629710 dated Nov. 3, 2021.
Chinese Office Action issued in Application No. 202010115748.1 dated May 11, 2021.

* cited by examiner

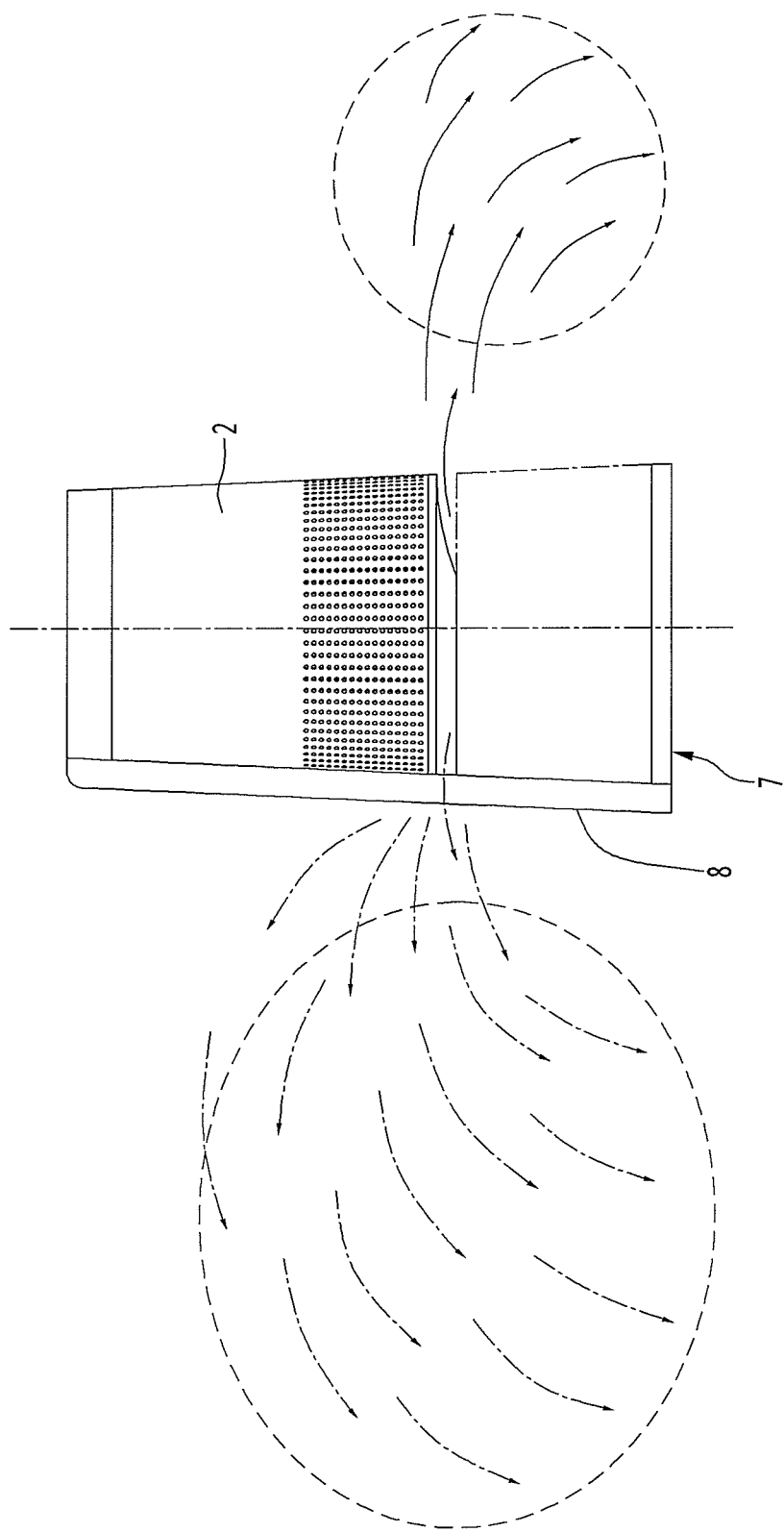

AIR PURIFIER AND AIR PURIFYING SYSTEM

CROSS-REFERENCE TO RELATED APPLICATION(S)

This application claims priority under 35 U.S.C. § 119 to Korean Application Nos. 10-2019-0031460 filed on Mar. 19, 2019 and 10-2019-0091560 filed on Jul. 29, 2019, whose entire disclosures are hereby incorporated by reference.

BACKGROUND

1. Field

The present disclosure relates to air purifiers and air purifying systems.

2. Background

An air cleaner or purifier may be an apparatus which suctions contaminated air, purifies the suctioned contaminated air, and then discharges purified air. The air cleaner may include a fan to suction outside or ambient air into an interior of the air cleaner and a filter to filter dust, germs, etc. in the suctioned air. Generally, an air purifier is configured to purify an indoor space such as a home or office.

The air cleaner may be mass-produced in a predetermined size and shape according to a predetermined design before being supplied to the market. The consumer may select and purchase an air cleaner among the mass-produced air cleaners that bests correspond to a desired size and capacity. However, such mass-produced air cleaners may not be completely suited or customized to a consumer's exact needs or specific residential environment, especially since just one residential environment may include many different indoor spaces, some having atypical shapes and sizes.

WO 2017/026761A1 discloses an air purifier capable of varying a suction and discharge of air based on a deformable filter. An air purifier corresponding to the capacity of a present indoor space may be implemented by modifying the filter in accordance with an installation environment of the air purifier. However, according to the above technique, it is difficult to know what shape should be implemented for the filter, and the filter must be manually modified by the user. Even if the filter of the air purifier is appropriately modified, the air purifier may still only efficiently clean one particular room or area.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 11 is a view showing cleaning of a side area in accordance with an action of the flow guide.

DETAILED DESCRIPTION

Figure 1:
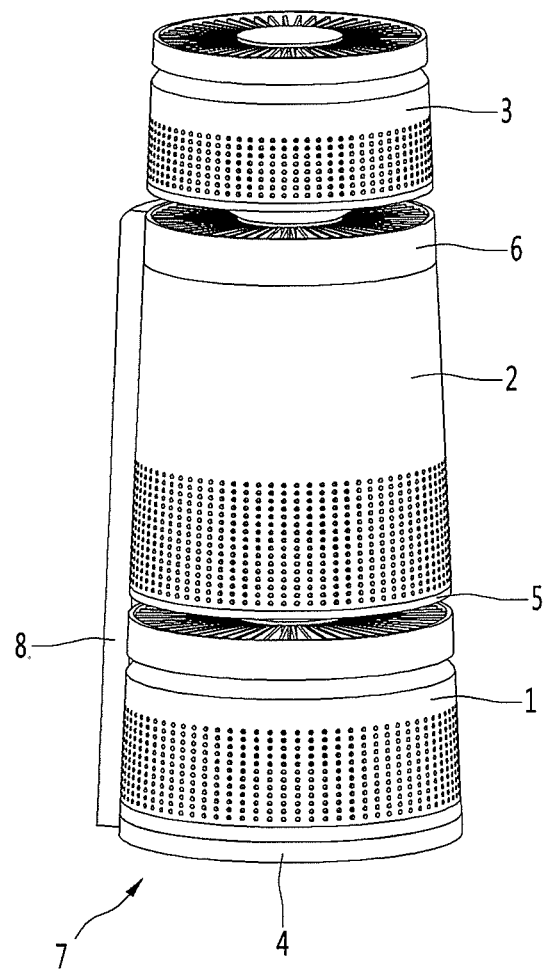
FIG. 1 is a front perspective view of an air cleaning or purifying system.

Referring to FIG. 1, an air cleaning or purifying system according to an embodiment may include three air cleaners or purifiers 1, 2, and 3 capable of independent operation. However, a number of independent air purifiers is not limited to three. A resting frame or docking station 7 may support a configuration where the three air purifiers 1, 2, and 3 are coupled together, and may limit a movement of the three air purifiers 1, 2, and 3. The docking station 7 may also be referred to as a dock or a base. The three air cleaners 1, 2, and 3 may be moved to different, various rooms or places in an indoor space based on a user's needs or judgment.

A weight of the docking station 7, or a total weight of the docking station 7 and any of the air cleaners 1, 2, and/or 3 fixed to the docking station 7, may be from several kilograms to several tens of kilograms, and the docking station 7 and any coupled air purifiers 1, 2, and/or 3 may not be easily moved by a user. At least one of the three air purifiers 1, 2, and 3 may have a weight of several kilograms or less, and the user may easily move such a lighter weight air purifier 1, 2, and 3.

The docking station 7 may be provided with a backbone or frame 8 extending upward, a first support or frame 4 extending forward from a bottom portion of the backbone 8, a second support or frame 5 spaced apart from the first end support 4 and extending forward from a middle portion of the backbone 8, and a third support or frame 6 extending forward from a top portion of the backbone 8. The first, second, and third supports 4, 5, and 6 may also be referred to as pedestals or trays.

Each of the air purifiers 1, 2, and 3 may correspond to a predetermined flow and discharge of clean air. Each air purifier 1, 2, and 3, may have a circular horizontal section for efficiently use of internal space and for easy stacking, but embodiments disclosed herein are not limited to circular cross-sections or cylindrical air purifiers 1, 2, and 3. For example, the air purifiers 1, 2, and 3 may have a rectangular or square cross-section. Each of the first, second, and third supports 4, 5 and 6 may be provided as a frame having a horizontal cross-section (e.g., circular) that corresponds to a shape or cross-section of each of the first, second, and third air purifiers 1, 2, and 3. Embodiments disclosed herein are not limited to three supports 4, 5, 6, and a number of supports may correspond to a number of air purifiers.

The first, second, and third air purifiers 1, 2, and 3 may be seated on upper surfaces of the first, second, and third supports 4, 5, and 6, respectively, so that the first, second, and third air purifiers 1, 2, and 3 may be vertically stacked via the backbone 8. Each of the first, second, and third air cleaners 1, 2, and 3 may be separated from the first, second, and third supports 4, 5, and 6 to be used separately at different places or positions.

Alternatively or in addition thereto, the second support 5 and the second air purifier 2 may be integrated or fixed to each other such that the second air purifier 5 remains mounted on the docking station 7. The second support 5 and the second air purifier 2 may be integrated with the docking station 7. At least one of the second support 5 and the second air purifier 2 may be integrated and/or fixed to the backbone 8.

The second air purifier 2 may be fitted with and fixed to the docking station 7 via the second support 5 so that a stable air cleaning may be performed in a room or space where the docking station 7 is placed. Since the docking station 7 and second air purifier 2 may be heavier and more difficult to transport than the first and third air purifiers 1 and 3, the docking station 7 and second air purifier 2 may be placed in a larger or dirtier room needing a stronger cleaning operation. For example, the docking station 7 and the second air purifier 2 may be placed in a main living space (e.g., a living room). The main space may be efficiently cleaned and purified by the second air purifier 2.

When the second air purifier 2 is integrated with the backbone 8, a center of gravity or mass of the air cleaning system may be higher since the second support 5 may be provided above and spaced apart from the first support 4 and/or since the second air purifier 2 may be larger than the first air purifier 1. Due to a higher center of gravity, there is a possibility of overturning, impact, or shock. Such a possibility may be more likely when third air purifier 3 is placed on the docking station 7 and when the first air purifier 1 is removed from the docking station 7.

In order to solve or offset this problem, the backbone 8 may be inclined forward or inward toward a central axis of the docking station 7, which may align with a center of the first support 1. The backbone 8 may be inclined inward towards the central axis from a bottom end to a top end. An inclination of the backbone 8 may be configured to move the center of gravity of the air cleaning system toward the central axis, and a center of gravity of the second air cleaner 2 and the docking station 7 may be further directed toward a center of the air cleaning system. The inclination of the backbone 8 may correspond to an inclination or tilt of outer circumferences of the first, second, and/or third air purifiers 1, 2, and/or 3. Even if the air cleaning system is inclined, an unintended movement or overturning of the air cleaning system may be reduced or prevented.

As the center of gravity of the air purifying system becomes more centered, shaking, turning, and a time for the air cleaning system to be restored to its initial position may be reduced. A central center of gravity may reduce overturning of both the docking station 7 and the third air purifier 3.

The first, second, and third air purifiers 1, 2, and 3 may have horizontal cross-sectional areas that decrease from bottom to top to lower a center of gravity of the air purifying system when all of the first, second, and third air purifiers 1, 2, and 3 are docked on the docking station 7. As the center of gravity of the air purifying system is lowered, the air cleaning system has make shake or vibrate less during external impact, and a restoration time may be reduced. Like a central center of gravity, a lower center of gravity may reduce overturning of both the docking station 7 and the third air purifier 3.

The first support 4 may be a rigid base frame to support an overall load of the air purifying system. The first air purifier 1 may have a smaller air cleaning capacity than that of the second air purifier 2, and a larger air cleaning capacity than that of the third air purifier 3. The ratio of the air cleaning capacities of the first, second, and third air purifiers 1 may be, for example, 8:15:5. Air cleaning or purifying capacities may be measured by cubic feet of air per minute or CFM.

As an example, the first air purifier 1 may be suitably used in a medium sized room such as a bedroom, the second air purifier 2 may be used in a larger room such as a living room or a family room, and the third stage air purifier 3 may be used for smaller or specialized spaces such as a study room or space, kitchen, or breakfast nook. For example, the third air purifier 3 may be separated from the docking station 7 and placed next to a stove or other cooking device to purify smoke generated from cooking food.

Figure 2:
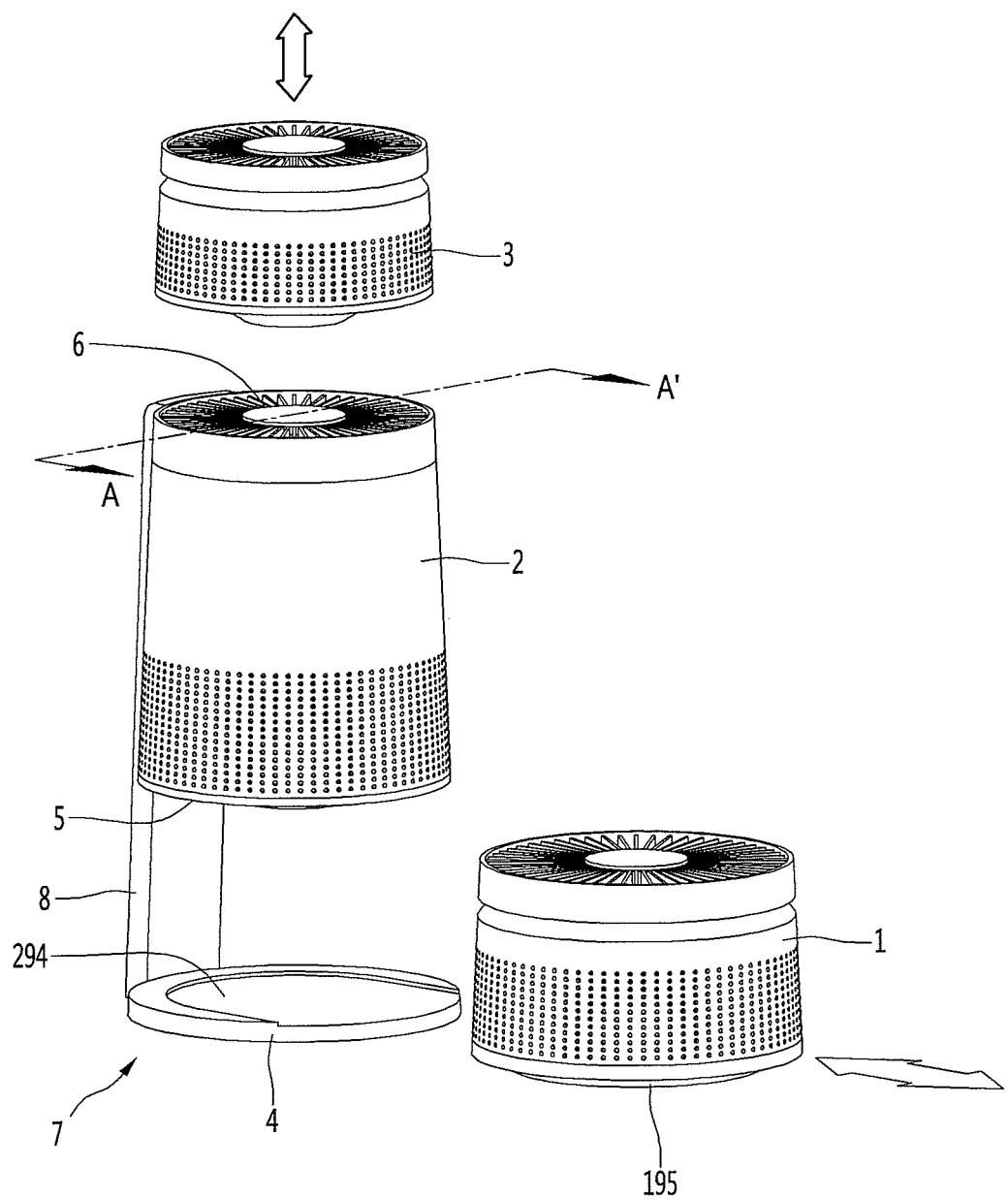
FIG. 2 is a view showing a separation method of each air cleaner or purifier.

Referring to FIG. 2, the second air purifier 2 may be provided with the above-mentioned docking station 7 as one body, and may have the largest weight and air cleaning capacity among the first, second, and third air purifiers 1, 2, and 3. The first air purifier 1 may be slid backward and forward along a seating recess or groove 294 that is depressed downward from an upper surface of the first support 4. The seating recess 294 may extend in a backward and forward direction and have a shape that corresponds to a shape of a seating guide or protrusion 195 protruding downward from a bottom surface of the first air purifier 1. The seating guide 195 may slide into and out of the seating recess 294, and the first air purifier 1 may be separated or undocked from the docking station 7 by pulling the first air purifier 1 forward out of the seating recess 294 of the first support.

The third air purifier 3 may be seated and mounted on top of the third support 6 of the docking station 7, and lifted and separated from the third support 6 of the docking station 7. The third support 6 may also have a seating groove that interacts with a bottom surface of the third air purifier 3, and may be formed above or in a top surface of the second air purifier 2.

When the first and third air purifiers 1 and 3 are mounted on the first and third supports 4 and 6, the docking station 7 may be connected to the first and third air purifiers 1 and 3 so that energy or electricity may be supplied to the first and third air suppliers 1 and 3 from the docking station 7. At least one of wired charging and wireless charging may be applied to power the docking station 7 and the first, second, and third air purifiers 1, 2, and 3. The docking station 7 may have a port or plug to connect, via a wire, to an external or commercial power support (e.g., wall socket). Alternatively or in addition thereto, the docking station 7 may have a transceiver for wireless power transfer (WPT) via wireless induction or other wireless power transfer methods.

Figure 3:
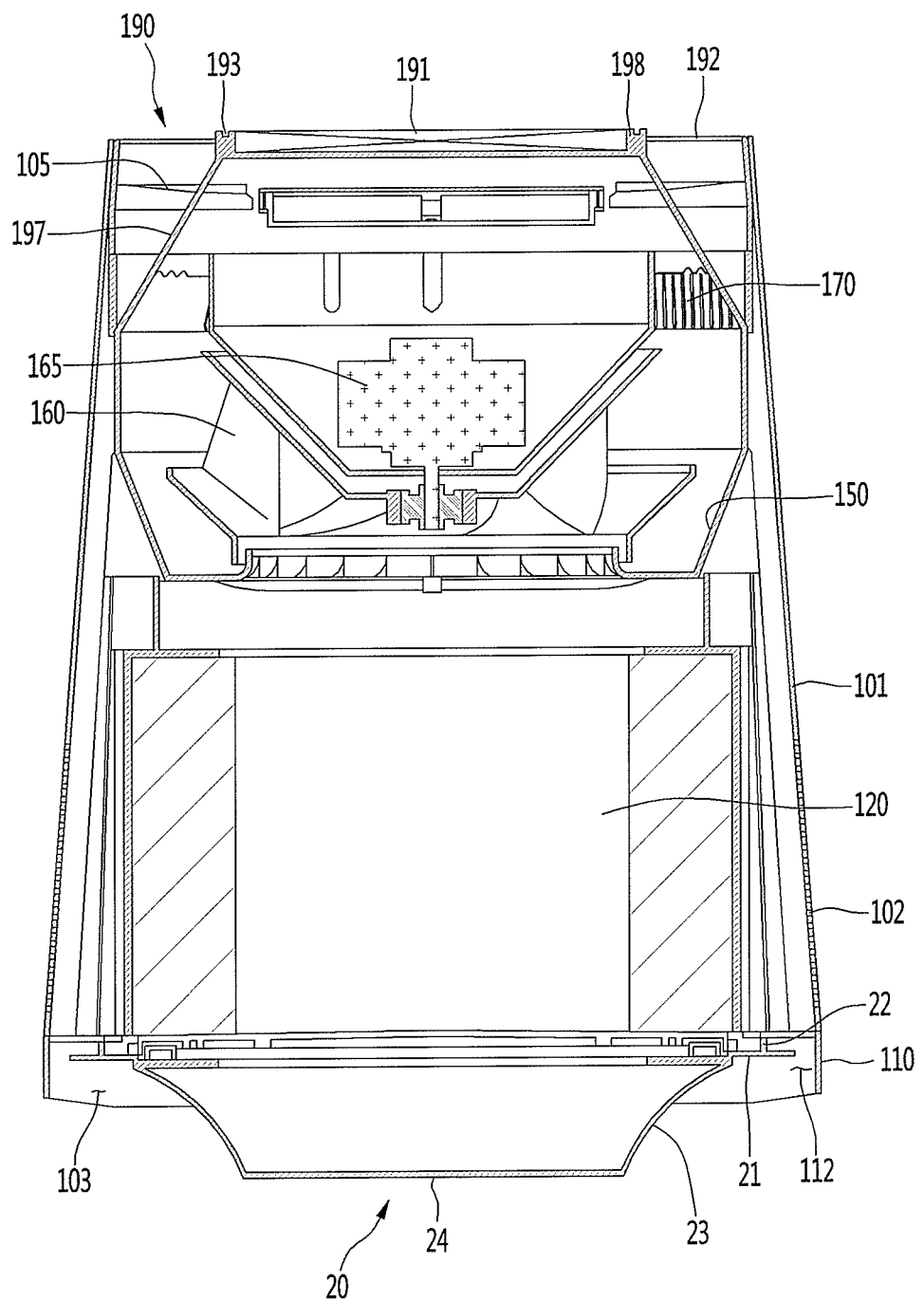
FIG. 3 is a sectional view taken along the line A-A' of FIG. 2 showing the internal structure of the air purifier.

The first, second, and third air purifiers 1, 2, and 3 may each have a fan or blower 160 and a filter 120 (FIG. 3). The fan 160 may provide negative pressure to suction ambient or outside air through a first side (e.g., a side surface) of the air purifier (1, 2, or 3) and through the filter 120 to filter out foreign matter. Clean air may be discharged through a second side (e.g., an upper surface).

Figure 4:
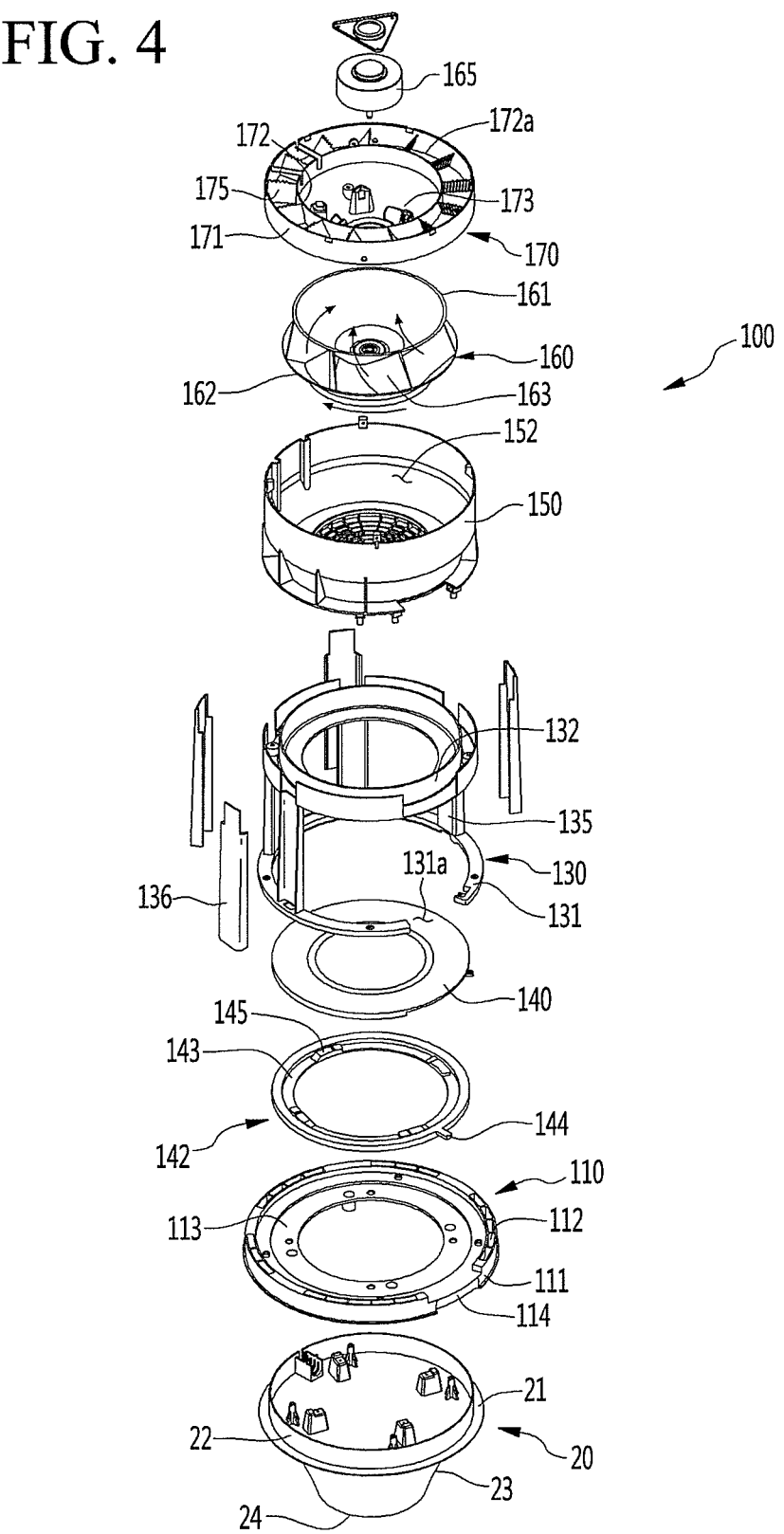
FIG. 4 is an exploded perspective view of a structure directly related to a blower or fan.

FIG. 3 is a cross-sectional view taken along the line A-A' of FIG. 2 showing an internal structure of each air purifier (1, 2, or 3), and FIG. 4 is an exploded perspective view where a case 101 and display 191 are removed to show a structure of the fan 160 and the filter 120. Internal configurations of each of the first, second, and third purifiers 1, 2, and 3 may be similar, although sizes and dimensions may be varied and changed for each air purifier 1, 2, and 3. An external shape of each air purifier 1, 2, and 3 may be changed depending on an intended position or air cleaning capacity.

For convenience of description, an internal structure of the second air purifier 2 will be described as an example.

Where internal structures of the first and third air purifiers 1 and 3 differ from the second air purifier 2, a description will be given.

Referring to FIGS. 3 and 4, the second air purifier 2 may generate an air flow by sucking ambient or outside air (e.g., indoor air in a living room) through a lower portion of the second air purifier 2 and discharging air out of an upper surface or side.

The second air purifier 2 may include a case 101 forming an outer appearance or surface. The case 101 may be provided as a circular cylinder or hollow truncated cone. The second air purifier 2 may be referred to as an air purifying module in that may purify or filter air through a filter 120.

The case 101 may include a separating device or lock in which two separate shells constituting the case 101 are joined or separated to open and close the case 101. The case 101 may further include a hinge provided on a side of the case 101 opposite to a side of the case 101 having the lock so that the two shells may rotate about the hinge during opening and closing. When the case 101 is opened, the case 101 may further be separated or removed from the air purifier 2 for replacement. The case 101 may also be opened to replace or repair internal devices (e.g., the fan 160) of the second air purifier 2.

A side suction portion or port 102 through which air is sucked may be formed in a lower portion of the case 101. The side suction portion 102 may be provided with at least one through-hole formed through at least a portion of the case 101. A plurality of through-holes may form the side suction portion 102.

The plurality of through holes of the side suction portion 102 may be uniformly formed in a circumferential direction along an outer circumferential surface of the case 101 so that air may be suctioned from any direction (i.e., from 360 degrees) with respect to an inner center of the case 101. The air sucked through the side suction portion 102 may flow in a substantially radial direction from the outer circumferential surface of the case 101.

A vertical direction may be referred to as an axial direction, and a horizontal direction may be referred to as a radial direction. The axial direction may correspond to a central axis or motor axial direction of the fan 160. The radial direction may be perpendicular to the axial direction. A circumferential direction may be a circular direction rotating about the axial direction with a turning radius in the radial direction.

The second air purifier 2 may include a base 20 provided below the case 101 and placed on a floor or ground surface if the second air purifier 2 is removed from the docking station 7. The base 20 may be provided below a lower end of the case 101. At least a portion of the base 20 may be laterally or vertically spaced apart from the case 101. A base suction portion or port 103 may be formed by a space between the case 101 and the base 20. A suction grill 110 may extend below the lower end of the case 101. The base suction portion 103 may be a space between the base 20 and the suction grill 110, and may include or communicate with a suction port 112 formed in the suction grill 110. Air sucked through the base suction portion 103 may flow upward through the suction port 112 near the suction grill 110. When the first air purifier 1 is provided below the second air purifier 2, air discharged from the first air purifier 1 may be suctioned through the base suction portion 103 and the suction port 112.

A discharge port or portion 105 may be formed in an upper portion of the second air purifier 2. Air discharged through the discharge portion 105 may flow upward in the axial direction. Clean air discharged through the discharge portion 105 may be spread radially by a discharge grill 192 provided downstream (i.e., above) the discharge portion 105. The discharge grill 192 may be an opening formed in a spiral shape such that clean air discharged through the discharge portion 105 and the discharge grill 192 may have a velocity component in the circumferential direction. The discharge portion 105 and the discharge grill 192 may collectively be referred to as a discharge guide device 190.

The base 20 may include a base body 21 configured to be placed on the floor or on the second support 5 and a base protrusion or flange 22 protruding upward from the base body 21. The base protrusion 22 may surround engagement devices provided on an upper surface of the base body 21 and configured to couple to holes formed in and/or engagement devices on a bottom of the grill body 111. At least a portion of the suction grill 110 and/or the case 101 may be placed on the base protrusion 22. The base suction portion 103 may form an air suction space provided adjacent to the base body 21 and flange 22, the suction grill 110, and/or a bottom end of the case 101.

The base 20 may further include a flow path guide 23 extending below the base body 21. The flow path guide 23 may be have a concavely curved side surface and a base bottom surface 24 provided at a lower end of the flow path guide 23. A cross-section of the flow path guide 23 may increase from the base bottom surface 24 upward toward the base body 21. The flow path guide 23 may be symmetrical in the radial direction, and may have a trumpet head or fountain head shape. The flow path guide 23 may guide air discharged from a discharge portion of the first air purifier 1 in the radial direction when the second air purifier 2 is stacked on top of the first air purifier 1.

The suction grill 110 may include a substantially ring-shaped grill body 111 and a plurality of suction ports or openings 112 formed at an edge or rim of the grill body 111. There may be sets of suction ports 112 spaced apart from each other along the rim in the circumferential direction. The plurality of suction ports 112 may communicate with the base suction portion 103.

The air purifier 2 may further include a filter or filter assembly 120 provided on or above the suction grill 110 to filter air suctioned through the suction port 112 and the base suction portion 103. Air may flow through the outer circumferential surface of the filter 120 and into the inside thereof. The filter 120 may have a cylindrical shape and a filter surface to filter air, but a shape of the filter 120 is not limited. A shape of the filter 120 may be configured to correspond to an inner contour of the case 101. For example, if the case 101 had a cubic shape, the filter 120 may also have a cubic shape. A type of filter 120 is not limited. For example, the filter 120 may be a HEPA filter, a carbon filter, a pleated filter, a mesh filter or strainer, a foam material, etc. or any combination of these filters.

The suction grill 110 may include a lever support portion or inner edge 113 to form an upper surface of the grill body 111 and to support a lever or locking device 142. The lever support portion 113 may be an inner radial edge recessed downward from an outer portion or edge of the grill body 111. An outer peripheral surface of the grill body 111 may have a groove or opening 114. The groove 114 may provide a space in which a handle or protrusion 144 of the lever device 142 may move.

The lever device 142 may be provided on the suction grill 110 and may be operated by a user. The lever device 142 may include a lever body 143 having a ring shape, and the lever device 142 may be rotated with respect to the suction grill 110 via the handle 144. The filter 120 may be provided on a filter support or support device 140, which may be seated on the lever body 143 of the lever device 142. When the lever device 142 is rotated clockwise or counterclockwise, the filter support 140 may be raised or lowered to fix and loosen the filter 120 for securing and removal.

The lever body 143 may include a lever protrusion or lock 145 protruding upward from an outer edge or rim of an upper surface of the lever body 143. There may be a plurality of lever protrusions 145 provided on the lever body 143 that are spaced apart from each other in the circumferential direction. Each lever protrusion 145 may have an inclined surface that is inclined upward or downward in the circumferential direction. The lever protrusions 145 may engage with a bottom of the filter support 140.

The handle 144 may protrude in the radial direction from the outer edge or an outer peripheral surface of the lever body 143. The user may hold the handle 144 and rotate the lever body 143 clockwise or counterclockwise by rotating the handle 144 in the groove 114.

The filter support 140 may be configured to hold or support the filter 120, and the lever device 142 may support the bottom of the filter support 140. The bottom of the filter support 140 may include a support protrusion that protrudes downward from an outer edge to contact or engage with the lever protrusion 145. There may be a plurality of support protrusions corresponding to the plurality of lever protrusions 145. Each support protrusion may have an inclined surface upward or downward in the circumferential direction.

When the lever body 143 is rotated via the handle 144, the lever protrusion 145 may be rotated with respect to the support protrusions of the filter support 140. When an upper or higher portion of the lever protrusion 145 abuts or contacts a lower portion of the support protrusion, the filter support 140 may be pushed upward to fix a position of the filter 120. In such a configuration, the inclined surfaces of the lever protrusion 145 and the support protrusion may not exactly align. When a lower portion of the lever projection 145 contacts or abuts an upper or higher portion of the support protrusion, the filter support 140 may descend downward. In such a configuration, the inclined surfaces of the lever protrusion 145 and the support protrusion may be aligned. When the filter support 140 is descended downward, a space may be formed so that the filter 120 may be removed from the second air purifier 2.

The second air purifier 2 may further include a filter frame 130, which may form a space in which the filter 120 may be mounted. The filter frame 130 may include a first or lower frame 131 forming a lower portion of the filter frame 130 and a second or upper frame 132 forming an upper portion of the filter frame 130.

The first frame 131 may have an approximate ring shape. An inner space of the first frame 131 may form at least a part of an air flow passage or channel passing through the filter frame 130.

The lever device 142 and the filter support 140 may be provided within an inner circumferential surface of the first frame 131. An upper surface of the filter support 140 may include a seating surface on which the filter member 120 is placed. The first frame 131 may include a cutout portion or a handle space 131a that allows movement of the handle 144 of the lever device 142. The handle 144 may be rotated clockwise or counterclockwise in the handle space 131a to rotate the filter support 140.

The second frame 132 may be provided above and spaced apart from the first frame 131. The second frame 132 may have an approximate ring shape. An inner space of the second frame 132 may form at least a part of the air flow passage passing through the filter frame 130. An upper portion or surface of the second frame 132 may support a fan housing 150, which will be described later.

The filter frame 130 may further include a side support or wall 135 extending between rims of the first frame 131 and the second frame 132. The first and second frames 131 and 132 may be spaced apart from each other by the side support 135. A plurality of side supports 135 may be arranged in the circumferential direction and spaced apart from each other. A shape of the side supports 135 may resemble a partial arc and have a curvature matching a curvature of the first and second frames 131 and 132. A support cover 136 may be coupled to an outer surface of the side support 135.

A mounting space of the filter 120 may be defined by the first and second frames 131 and 132 and the plurality of side supports 135. Shapes of the first and second frames 131 and 132 and the side supports 135 may not be limited to circles to create a cylindrical mounting space for a cylindrical filter 120, and may be configured to correspond to alternative filter 120 shapes. For example, the filter 120 may have a cuboid shape, a curved cube or rectangle shape, or an ellipsoid shape, and the first and second frames 131 and 132 may have a square shape or rectangle shape, a curved square shape, cushion shape, or stadium shape, or an elliptical shape, respectively.

The filter 120 may be detachably mounted or seated in the mounting space. Air may be introduced through an outer peripheral (e.g., circumferential) surface of the filter 120. In the process of passing through the filter 120, impurities such as fine dust, dirt, or other debris in the air may be filtered. Air may be introduced into the filter 120 from any direction or at any angle with respect to the filter member 120. Accordingly, the filtering area of the air may be increased.

A mounting space may have a shape (e.g., cylindrical) corresponding to the shape of the filter 120. The filter 120 may be slidably received in the mounting space during a mounting or attachment process, and may be slidably drawn out from the mounting space in a separating or removal process.

During removal, the handle 144 may be operated to lower the filter support 140 and filter 120 into a release position. A vertical space or distance between the filter support 140 and the second frame 132 may be increased, and the filter 120 may be pulled or slid radially outward and separated from the mounting space.

During replacement, the filter 120 may be pushed or slid radially inward into the mounting space and may be placed on the upper surface of the filter support 140. The handle 144 may be operated to raise the filter support 140 and the filter 120 to an engagement position. The vertical distance between the filter support 140 and the second frame 132 may be decreased to secure the filter 120 between the filter support 140 and the second frame 132.

A suction pressure may be provided by a fan 160 to suction air through the side and base suction portions 102 and 103 and through the filter 120. The fan 160 may be provided above the filter 120 to suction air upward.

A fan housing 150 may be provided at an outlet side (i.e., above) the filter 120. The fan 160 may be provided in the fan housing 150. The fan housing 150 may be supported by the second frame 132 of the filter frame 130.

An inner surface of a lower portion of the fan housing 150 may include a fan guide or fan recess 152, which may have an inner contour or shape configured to guide an inflow of air into the fan housing 150. A lower or bottom portion of the fan recess 152 may include a grill to prevent fingers or other objects from going into the fan housing 150 during removal and insertion of the filter 120.

A display housing 198 accommodating a display 191 may be provided at the top of the second air purifier 2. The display housing 198 may be supported by a support rib 197 extending from the fan housing 150. The display housing 198 may be connected to the pen housing 150 to have a larger structural strength. The display housing 198 can support the load of the third air purifier 3 while supporting the weight of the display.

A support rib 197 extend above the fan housing 150. The display housing 198 may be provided on an upper end of the support rib 197. The display 191 may display an operating state of each air purifier among the first, second, and third air purifiers 1, 2, and 3 provided with the air cleaning system.

A seating groove or recess 193 may be formed on an upper surface or rim of the display housing 198. The seating groove 193 may receive a seating projection or flange 194 (FIG. 8) formed on the bottom of the third air purifier 3 to secure the third air purifier 3. The second air purifier 2 may support the third air purifier 3 via the seating groove 193 and the seating projection 194. The third air purifier 3 may also be supported by the third support 6 of the backbone 8. Details of the seating groove 193 and seating projection 194 are provided with reference to FIG. 8.

The fan 160 may be or include a centrifugal fan to suction air in the axial direction and to discharge air upward in the radial direction. The fan 160 may include a hub 161 coupled to a rotation shaft of a fan motor 165, which may be a centrifugal fan motor. A plurality of shrouds 162 may be provided at an outer side of the hub 161, and a plurality of blades 163 may be provided or formed between the shrouds 162. The fan motor 165 may be coupled to the fan 160.

The hub 161 may have a bowl shape having a diameter or cross-sectional area that decreases in a downward direction. The hub 161 may include a shaft coupling portion to which the rotation shaft of the fan motor 165 is coupled and a first blade coupling portion that extends upward from the shaft coupling portion in an inclined manner.

The shroud 162 may include a shroud suction port provided at a bottom or lower end to suck air that has passed through the fan recess 152. A second blade coupling portion may extend upward from the lower end of the shroud 162.

One side of the blade 163 may be coupled to the first blade coupling portion of the hub 161 and the other side of the blade 163 may be coupled to the second blade coupling portion of the shroud 162. The plurality of blades 163 may be spaced apart from each other in the circumferential direction of the hub 161.

Air passing through the filter 120 may flow upward into the fan housing 150 through the fan recess 152. The air may flow in the axial direction of the fan 160 and flow out via the blade 163. An edge of the blade may be inclined outward and upward with respect to the axial direction so that outflowing air may flow upward in the radial direction.

An air guide 170 may be coupled to the fan 160 to guide a flow of the air passing through or discharged from the fan 160. The air guide 170 may be provided above the fan housing 150. As an example, the air guide 170 may have an outer diameter corresponding to an outer diameter of the fan housing 150 and be stacked onto the fan housing 150 to guide the flow of the air from the fan 160.

The air guide 170 may include an outer wall 171 having a cylindrical shape and an inner wall 172 having a cylindrical shape located inside the outer wall 171. The outer wall 171 may surround the inner wall 172 and be spaced apart from the inner wall 172 such that a diameter of the outer wall 171 is greater than a diameter of the inner wall 172. The diameter of the outer wall 171 may define an outer diameter of the air guide 170, and the diameter of the inner wall 172 may define an inner diameter of the air guide 170. A first air passage 172a through which air flows may be formed between an inner circumferential surface of the outer wall 171 and an outer circumferential surface of the inner wall 172.

The air guide 170 may further include a motor receiving portion or container 173 extending downward from the inner wall 172 to receive the fan motor 165. The motor receiving portion 173 may have a bowl shape having a diameter that decreases in the downward direction. A motor coupler or fastener may be provided on a side of the fan motor 165, and the motor coupler may guide and fix the fan motor 165 to the air guide 170. The shape of the motor receiving portion 173 may correspond to a shape or inner contour of the hub 161 so that the motor receiving portion 173 may be inserted into the hub 161.

The fan motor 165 may be supported by an upper side of the motor receiving portion 173. The rotation shaft of the fan motor 165 may extend downward from the fan motor 165 and may be coupled to the shaft coupling portion of the hub 161 through an opening or hole formed in a bottom of the motor receiving portion 173.

The air guide 170 may further include a guide vane or rib 175 provided in the first air passage 172a. The guide vane 175 may extend from the outer circumferential surface of the inner wall 172 to the inner circumferential surface of the outer wall 171, and may extend upward in an oblique or inclined way from a lower portion of the outer wall 171 and the inner wall 172. The guide vanes 175 may be spaced apart from one another. The guide vanes 175 may add structural rigidity and support to the air guide 170.

The plurality of guide vanes 175 may function to guide the air introduced into the first air passage 172a from the fan 160 upward, and a shape or inclination of the guide vanes 175 may be configured to discharge air at a predetermined angle. For example, each guide vane 175 may be rounded or curved to guide the air to flow upward in the axial direction.

Figure 5:
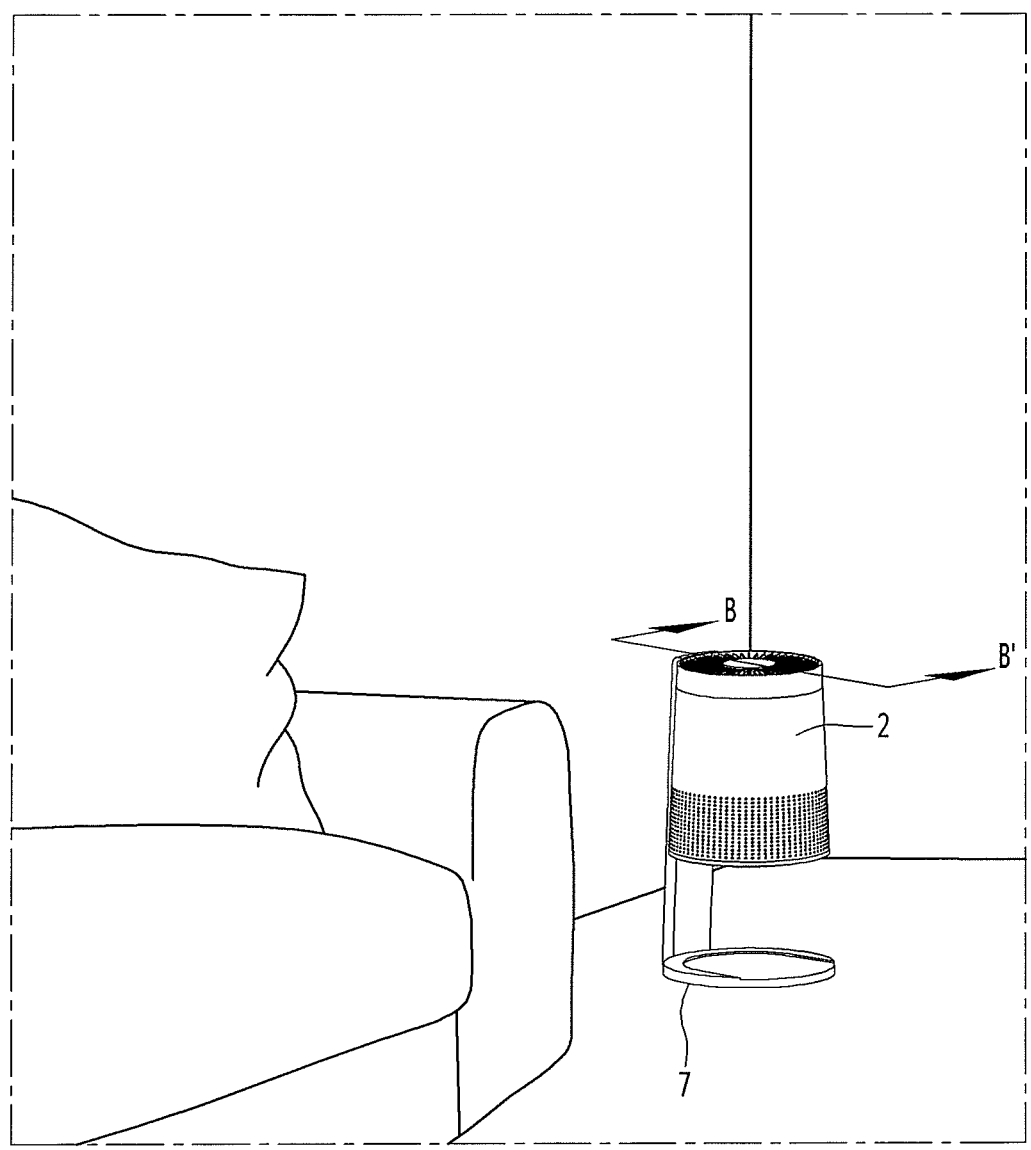
FIG. 5 shows an example of a second or main air purifier being used.
Figure 6:
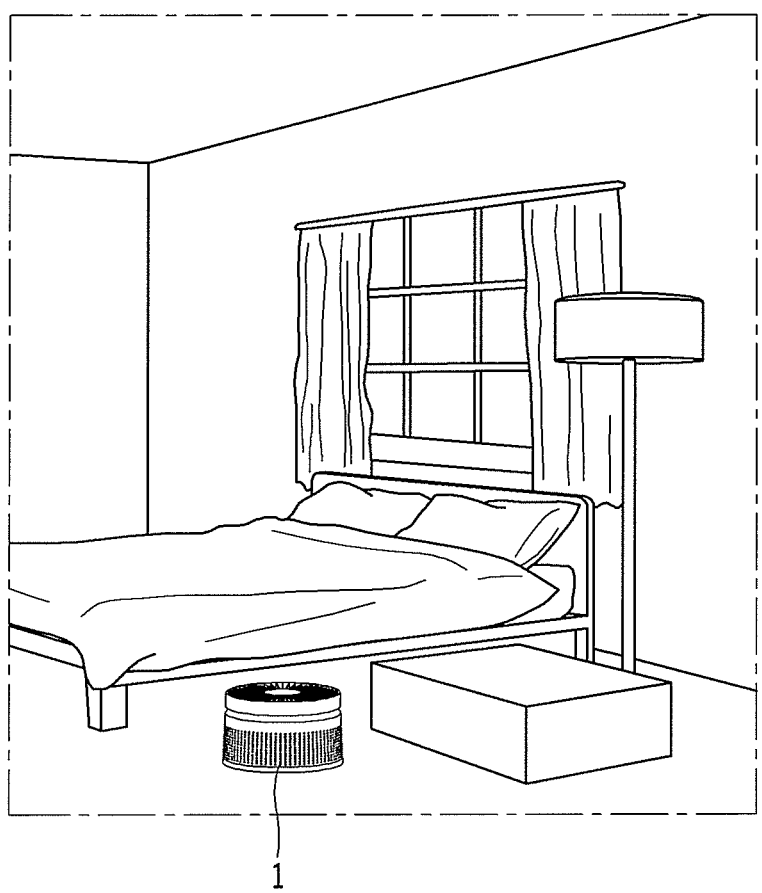
FIG. 6 shows an example of a first or bottom air purifier being used.
Figure 7:
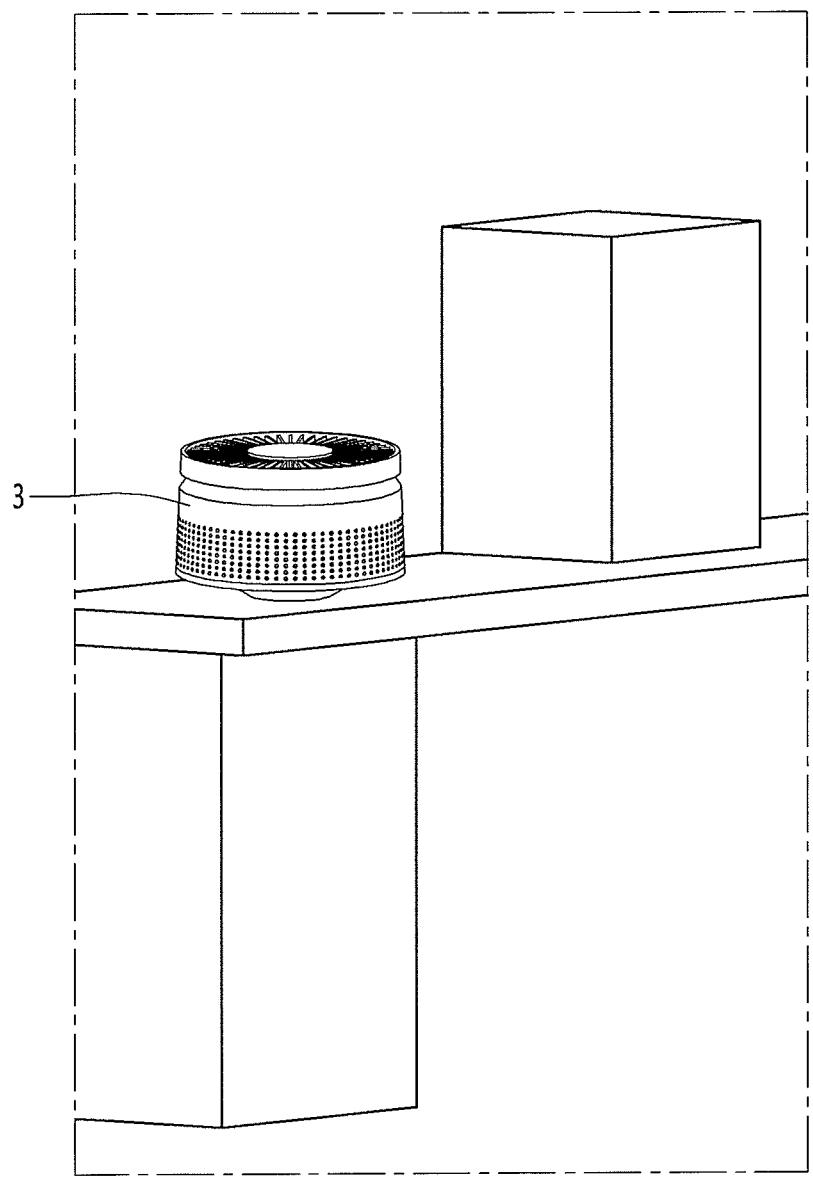
FIG. 7 shows an example of a third or top air purifier being used.

Referring to FIGS. 5 to 7, the air purifiers 1, 2, 3 may be used in a variety of combinations for various uses. A ratio of air cleaning capacity and/or CFMs of the first, second and third air purifiers 1, 2, and 3 may be set to 8:15:5 so that the air purifiers 1, 2, 3 may be used individually or in combination to address various air purifying needs.

Among the first, second, and third air purifiers 1, 2, and 3, the second air purifier 2 may be more difficult to move because the second air purifier 2 and the docking station 7 may be provided as one body. The second air purifier may be placed in a largest or dirtiest room (e.g., living room) among general indoor spaces. The second air purifier 2 may have a heavier weight than the first and third air purifiers 1 and 3 and also a higher air cleaning capacity.

The first air purifier 1 may be stacked in a lowermost position on the docking station 7, and may have a largest horizontal cross-sectional area among the first, second, and third air purifiers 1, 2, 3. The horizontal cross-sectional areas of the first, second, and third air purifiers 1, 2, and 3 may decrease from a bottom to a top. Since the first air purifier 1 may have the largest horizontal cross-sectional area, the first air purifier 1 may have a relatively large air cleaning capacity. As an example, the first air purifier 1 may be placed in a bedroom, since many bedrooms are fairly large, but still smaller than living rooms, where the second air purifier 2, which may have the largest or strongest air cleaning capacity, may be placed.

The first air purifier 1 may be used separately from the docking station 7. A charging means (e.g., a wire, a terminal, or a wireless power transceiver) may be provided between the docking station 7 and the first air purifier 1 when the first air purifier 1 is docked, and a battery charged by the charging means may be provided in the first air purifier 1. As an example, the battery may be provided in a bottom of the first air purifier 1 to keep a center of gravity low and to correspond to a position of the charging means in the docking station 7, but positions of the battery are not limited hereto. The charging means may be provided in the first support 4. The first air purifier 1 may also be provided with a power supply means such as a plug or wire, and may be operated for a long time in a separated state when the plug is connected to an external commercial power supply (e.g., wall socket).

The third air purifier 3 may be stacked in an uppermost position on the docking station 7, and may have the smallest horizontal cross-section among the first, second, and third air purifiers 1, 2, and 3. The third air purifier 3 may have the smallest air cleaning capacity among the first, second, and third air purifiers 1, 2, and 3, and may be placed in smaller rooms or rooms having a specialized purpose, such as a study room or a kitchen.

The third air purifier 1 may be used separately from the docking station 7 and the second air purifier 2. A charging means (e.g., a wire, a terminal, or a wireless power transceiver) may be provided between the second air purifier 2 and the third air purifier 3, and a battery charged by the charging means may be provided in the third air purifier 3. As an example, the battery may be provided in a bottom of the third air purifier 3 to keep a center of gravity low and to correspond to a position of the charging means in the second air purifier 2, but positions of the battery are not limited hereto. The third air purifier 3 may be provided with a power supply means (e.g., a wire or plug), and may be operated for a long time in a separated state when the plug is connected to an external or commercial power supply (e.g., a wall socket). As a small capacity air purifier, the third air purifier 3 may have a smaller size and weight than the first and second air purifiers 1 and 2 so that the user may easily move and use the third air purifier 3.

The second air purifier 2 may also include a battery that is charged by external power connected to the docking station 7. If external power is temporarily disconnected, the first, second, and third air purifiers 1, 2, and 3 may continue to operate.

Figure 8:
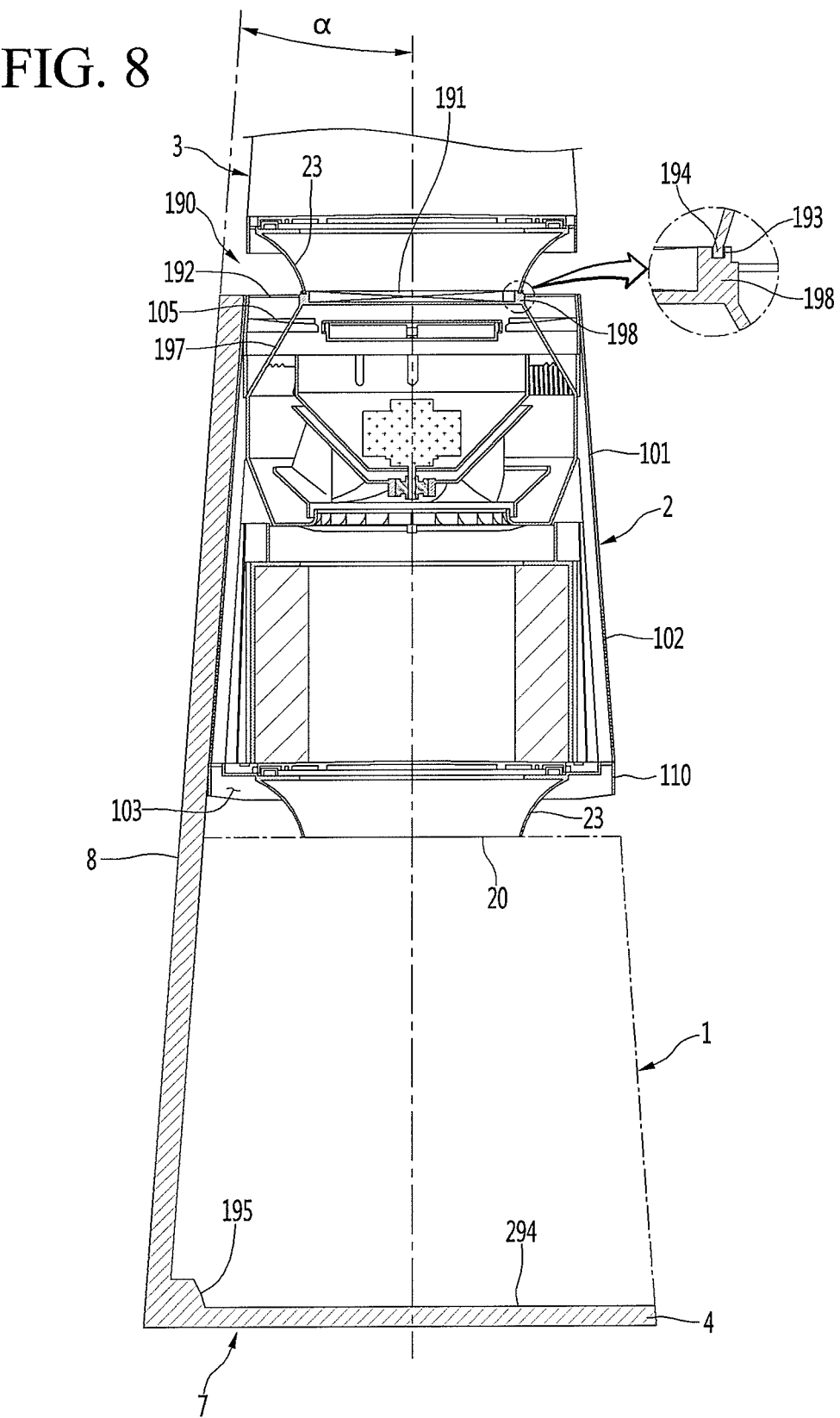
FIG. 8 is a sectional view taken along the line B-B' in FIG. 5.

Referring to FIG. 8, the first support 4 of the docking station 7 may serve as a bottom plate to support the first air purifier 1 and to prevent a movement or overturning of the docking station 7. The backbone 8 may extend upward from a rear end of the first support 4. The first support 4 may have a circular shape or a horizontal-cross sectional shape corresponding to a horizontal cross-sectional shape of the first air purifier 1, but embodiments disclosed herein are not limited. For example, the first air purifier 1 may be cylindrical, the first support 4 may be square, and the seating recess 294 may be circular to correspond to a bottom of the first air purifier 1.

The backbone 8 may support a weight of the second and third air purifiers 2 and 3. The backbone 8 may be formed in a bar or rod frame shape and may be made of a rigid material such as a resin, steel, or wood. The backbone 8 may be painted.

The backbone 8 may be inclined at a predetermined angle α relative to the first support 4 and/or the floor or ground surface. The predetermined angle α may be an acute angle such that the backbone 8 tilts inward, from a bottom to a top, toward a center or toward a vertical axis aligning with a center of the first support 4. The center of gravity of the air cleaning system may be centered via the predetermined angle α, and overturning of the docking station 7 may be prevented.

The second support 5 (FIG. 1) may be provided integrally with the second air purifier 2 and/or the backbone 8. The second support 5 may be formed on a bottom or lower portion or side of the second air purifier 2 and also formed with an inner side of the backbone 8 when the second support 5 is integrated with the backbone 8. In an alternative embodiment, the second support 5 may extend from the backbone 8, and the second air purifier 2 may be placed on and lifted off of the second support 8.

The base 20 having the flow guide 23 may be formed on a bottom of the second support 5 and/or the bottom of the second air purifier 2. A center of the flow guide 23 may be vertically spaced from a center of a discharge grill provided on top of the first air purifier 1. The air discharged from the discharge grill of the first air purifier 1 may be guided by the flow guide 23 of the second air purifier 2 to be discharged to a side of the air cleaning system. The clean air discharged sideways may create a clean side area adjacent to the air cleaning system. The third air purifier 2 may also have a base and flow guide 23 extending from a bottom that is spaced apart from the discharge grill 192 provided on a top of the second air purifier 2. Air from the discharge grill 192 of the second pair purifier 2 may be guided by the flow guide 3 of the third air purifier 3 to be discharged to a side of the air cleaning system.

More generally, when two or more air purifiers 1, 2, 3, etc. are arranged and stacked vertically and configured to be separated from each other, bottom surfaces of the upper air cleaners 2, 3, etc. may serve as flow guides 23 to guide clean air discharged from tops of the lower air cleaners (1, 2, etc.) toward the side in a radial direction. According to such a configuration, an air cleaning system having two ore more air purifiers may be used in combination in a slim and simple manner.

A rim of the flow guide 23 of the third stage air purifier 3 may correspond to a rim of the display housing 198. A top of the display housing 198 may include the seating groove 193 in which a seating projection 194 formed on the bottom of the third air purifier 3 may be inserted. The seating projection 194 may be a singular flange extending downward from the bottom of the third air purifier, or there may be a plurality of seating projections 194 spaced apart a perimeter of the flow guide 23 (i.e., in the circumferential direction). Similarly, the seating groove 193 may be a singular groove formed downward into the display housing 198, or there may be a plurality of seating grooves 193 formed in the display housing 198 to correspond to the plurality of seating projections 194.

The third air purifier 3 may be secured to the second air purifier 2 via the seating projection 194 and the seating groove 193 so that the third air purifier 3 may remain stacked on the second air purifier 2 during any external impacts. A shape and size of the seating projection 194 may correspond to a shape or inner contour and size of the seating groove 193 so that the seating projection 194 may be fitted into the seating groove 193. The seating projections 194 may insert into the seating grooves 193 in the vertical or downward direction so that, to remove the third air purifier 3, the third air purifier 3 may simply be lifted. The top of the second air purifier 2 and/or the seating groove 193 may serve as the third support 6, and a separate third support may be omitted. Heavy parts, components, or devices may be placed at a bottom center of the third air purifier 3 to lower and center a center of mass or gravity to prevent overturning. The support rib 197 (FIG. 3) may extend from a top of the fan housing 150 to support the display housing 198. The support rib 197 (FIG. 3) may be inclined toward a center.

A coupling between the second air purifier 2 and the third air purifier 3 may not be limited to the seating groove 193 and seating projections 194. The third air purifier 3 may alternatively be secured to the second air purifier 2 via magnetic coupling. For example, a metal or first magnet may be provided in a bottom of the third air purifier 3 and a metal or a second magnet having an opposite polarity to the first magnet is placed in a top of the second air purifier 2.

The second air purifier 2 may support a weight of the third air purifier 3. A weight of the third air purifier 3 may be supplied to the second air purifier 2 through the display housing 198, the support rib 197, and the fan housing 150. The backbone 8, which may be fixed to the second air purifier 2 and/or the second support 5, may support the weight of the second air purifier 2 through the case 101.

Figure 9:
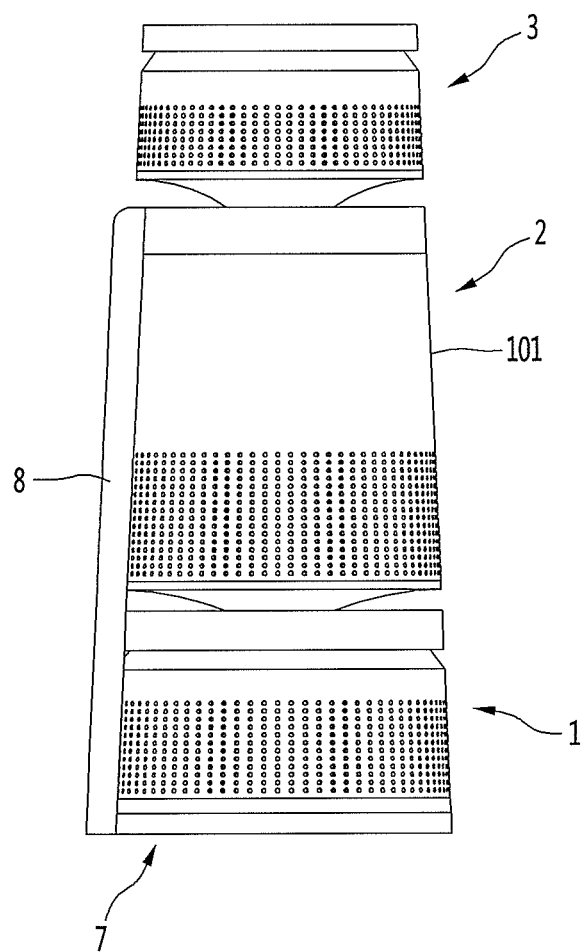
FIGS. 9 and 10 are views explaining a coupling relationship between a backbone and a second stage air purifier.

Referring to FIG. 9, the second air purifier 2 may be coupled to the backbone 8 via first and second fastening members 801 and 802 (e.g., tabs, screws, bolts, etc.) protruding from sides of the backbone 8 to connect to sides of upper and lower sections of the second air purifier 2. The second support 5 (FIG. 1) may be optional. The first air purifier 1 may be drawn out laterally from under the second air purifier 2, and the third air purifier 3 may be lifted up above the second air purifier 2. The second air purifier 2 and the backbone 8 may be separately manufactured and fastened via the first and second fastening members 801 and 802. However, since the backbone 8 and/or the first and second fastening members 801 and 802 may not be durable or wear out, alternatively, the backbone 8 may be formed integrally with the second air purifier 2, as shown in FIG. 10.

Figure 10:
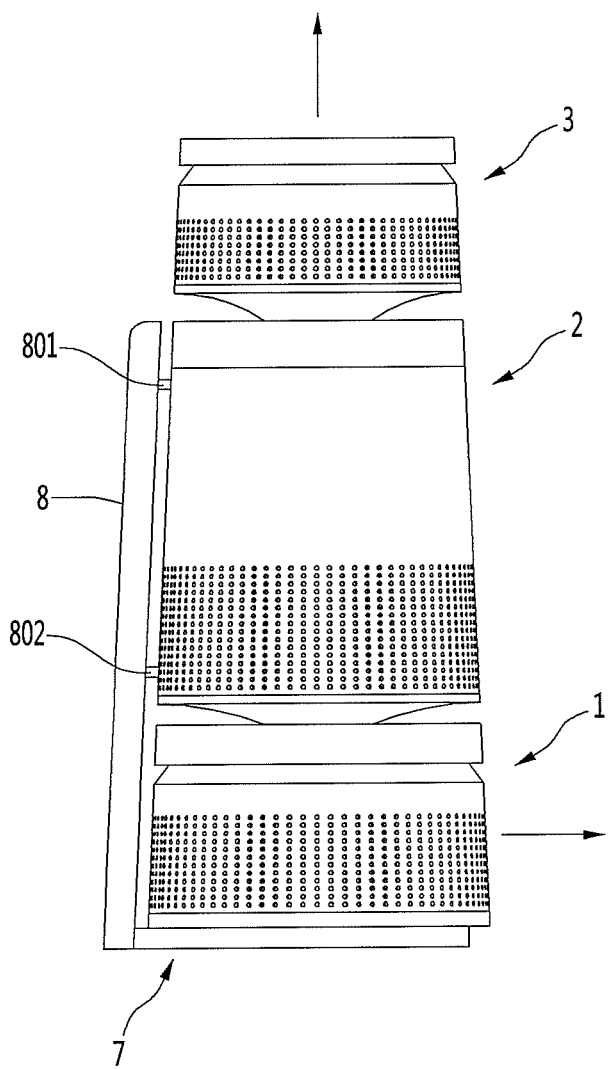

Referring to FIG. 10, in an alternative configuration of the backbone 8, the backbone 8 may be entirely integrated with a side surface of the second air purifier 2, which may increase strength and durability. However, it may be difficult to manufacture such a structure via, e.g., injection molding or other methods of fabrication.

Referring to FIG. 11, a flow direction of clean air discharged from the first air purifier 1 may be changed from the axial direction to the radial direction via the flow guide 23. The arrows show the flow of the discharged air blown out from the first air purifier 1. Air immediately discharged from the discharge grill of the first air purifier 1 may have a relatively large flow rate before being guided by the flow guide 23 toward a lateral side area. The flow guide 23 and/or a flow rate of the air (via the fan 160) may be configured to target a first predetermined side area, as shown in FIG. 11 by the dotted line on the right. The air discharged from the first air purifier 1 may not initially be very dispersed and may flow primarily in the axial direction. The air guided by the flow guide 23 may be guided toward the first predetermined side area, and clean air may be concentrated in the first predetermined side area. The first air purifier 1 may be wider than longer because an axial flow velocity of discharged air may be strong. When the flow guide 23 is not provided, air discharged from the first air purifier 1 may have a flow rate and concentration similar to as shown in FIG. 11 by the dotted line on the left.

A location of the first air purifier 1 may be configured such that the predetermined first area is provided 50 centimeters or less from a play area for infants. Using the flow guide 23 may result in more intensive air purification in areas adjacent to a side of the first air purifier 1, and may be used when the first air purifier 1 is first brought home, when the capacity of the first air purifier 1 is insufficient, or when the first air purifier 1 initially starts operating.

This application is related to co-pending U.S. application Ser. No. 16/818,180 filed on Mar. 13, 2020 and Ser. No. 16/819,368 filed on Mach 16, 2020, the entire contents of which are hereby incorporated by reference.

Embodiments disclosed herein may perform various air cleaning or purifying operations corresponding to various rooms or purposes of an indoor space by being implemented as a single air cleaning or purifying system provided with a plurality of air cleaners or purifiers. The air purifying system may be configured for industrial application.

It will be apparent to those skilled in the art that various modifications and variations can be made in the present disclosure without departing from the spirit or scope of the disclosure. It can be said that the present disclosure is also included within the scope of the present disclosure.

In the description, the air purifying system may be operated in cooperation with at least two air purifiers capable of individually operating in a single space or in separate spaces. The air purifying system may include at least two air purifiers capable of individually operating together by different elements, components, or devices. The air purifying system may be separated from other elements, components, or devices by at least one air purifier capable of individual operation. At least two air purifiers capable of individually operating may be separated, and individual operations may be performed in different environments.

Embodiments disclosed herein may provide an air purifier or purifying system capable of efficiently operating in various different spaces. Air cleaning for a required space may be performed by simply moving individual elements or devices to a predetermined position or space without requiring a user to operate them or manually modify them. The air purifier and purifying system may be capable of addressing various physical needs, personal needs, and environmental needs of an installation space.

An air purifying system may include at least three air purifiers capable of independently operating. A louver or support may support the at least three air purifiers. The air purifiers may be separated or assembled together, and the air purifying system may be operated in various states desired by the user.

The support may include a backbone extending in a vertical direction and a pedestal or base protruding forward from a bottom of the backbone. The base may also be referred to as a dock. The air cleaner may be conveniently handled at the base.

The at least three air purifiers may include a first stage air cleaner or purifier placed on the base, a second stage air cleaner or purifier supported on the backbone above the first stage air cleaner, and a third stage air cleaner or purifier supported on an upper surface of the second stage air cleaner. The second stage air cleaner may be a main cleaner having a larger size and may blow clean air to an entire indoor space. The first stage air cleaner may be pulled forward to separate from the base, and the third stage air cleaner may be lifted upward to separate from the backbone and second stage air cleaner, thereby making handling by the user convenient.

Bottom surfaces of any one of the at least three air cleaners may include a flow guide to guide clean air discharged from the other air cleaners. Accordingly, at least three air purifiers may be stacked, thereby improving space efficiency. In addition, the air guides may discharge air outward toward sides, thereby improving user satisfaction.

The base may be provided with a seating groove that is formed in a forward-backward direction to guide a sliding pulling or pushing movement of the first stage air cleaner on the base, thereby facilitating separation and mounting of the first air cleaner on the base. The backbone may be inclined at a predetermined angle relative to the base so as to prevent the air cleaning system from overturning due to its own weight, to prevent falling when the air cleaner is placed, and to increase shock absorption on impact. At least one of the three air cleaners may have a circular horizontal cross-section, and a radius of the cross section may recede from a bottom to a top to maintain a low center of gravity.

An air cleaning capacity of the second stage air cleaner may be the largest of the air cleaners while an air cleaning capacity of the third stage air cleaner may be the smallest of the air cleaners so that the air cleaning system may be implemented and operated in accordance with various capacities of the indoor space. For example, a ratio of the air cleaning capacity of the first, second, and third stage air cleaners may be set to 8:15:5. Such a ratio may correspond to capacities configured for a living room or family room, a bedroom or smaller living area, and a kitchen or a study room.

Embodiments disclosed herein may be implemented as an air purifier including a case having a fan and a filter, a base provided below the case, and a flow guide which is provided on the base and protrudes or curves upward from the center of the base to have an upward convex curvature. Clean air flowing in an axial direction from below can be guided in a radial direction and outward toward a lateral space or area. The base may be provided in a round (e.g., circular shape) so that air discharged upward from another air cleaner provided below the base may be guided radially and smoothly.

Embodiments disclosed herein may be implemented as an air cleaning or purifying system comprising at least two air cleaners or purifiers capable of independently operating, and a docking frame or dock to support the at least two air cleaners to perform an air cleaning operation with respect to a compartmented indoor space such that, even if a single air cleaning system is used, two or more air cleaners may be function.

The dock may include a backbone that extends vertically and a pedestal to support the backbone. The dock may serve as a hub for each air cleaner. The at least two air cleaners may include a first air cleaner fixed to the dock and a second air cleaner detachable from the dock. The second air cleaner may be detachably fixed to the dock and may be separable so that the air cleaner may be cleaned. The at least two air cleaners may perform different air purifying functions corresponding to volumes of a plurality of partitioned indoor spaces by providing different air purifying capacities.

The second air cleaner may be placed under the first air cleaner and may be vertically spaced apart from the first air cleaner so that a discharge of air may be more smooth in a narrow indoor space and so that a stronger suction of contaminated air and discharge of clean air may be performed when the second air cleaner is incorporated.

A seating groove may be provided in the dock so that the second air cleaner may be moved forward and backward from the backbone. The seating groove may make a seating position of the second air cleaner visible, and a connection between the dock and the second air cleaner may be stable in maintaining a correct position of the second air cleaner.

The second air cleaner may be placed on an upper side or surface of the first air cleaner to be vertically spaced apart from the first air cleaner to provide a smooth, strong, and efficient flow of clean air in a narrow indoor space when the second indoor air cleaner is incorporated. A seating groove may be provided at an upper surface of the first air cleaner and a seating protrusion may be provided at a lower surface of the second air cleaner so as to correspond to the seating groove. The second air cleaner may be stably positioned by fitting the seating protrusion on the seating groove, and overturning of the second air cleaner may be reduced or prevented.

The seating groove may be provided at an edge of a display housing on which a display is placed. The second air cleaner may be stably supported on the seating groove.

The first air cleaner may have a larger air cleaning capacity than the second air cleaner so that an air cleaning function for another indoor room space may be performed simultaneously with an initial indoor room or space. Since the dock may have a fixed position, a larger air cleaning capacity may be given to the first air cleaner, which is fixed to the dock, and the dock and first air cleaner may be provided in a larger or dirtier room to improve usability.

At least two air cleaners suitable for a plurality of compartmentalized or partitioned indoor spaces may be integrated into a single air cleaning system. Accordingly, clean air can be appropriately supplied to each of the plurality of indoor spaces at the same time.

The individual air cleaners may be conveniently moved and placed in a position for charging. The user may carry out an optimal air cleaning operation by separating and carrying a particular air cleaner of a desired capacity and moving it to a particular place for operation. When the separated air cleaner is provided with a separate power connection line or port, the separated air cleaner may be operated for a long period of time even while separated from the dock.

A plurality of individual air cleaners may be used together or separately to address specific or various purposes, and may provide multiple, various air cleaning operations. The air cleaning system may be used in response to a more diverse range of consumer needs.

Embodiments disclosed herein may be implemented as an air purifying system comprising a backbone extending in a vertical direction, and at least one support extending laterally from the backbone. The at least one support may include a bottom support extending laterally from a bottom of the backbone. A first air purifier may be positioned on the bottom support. A second air purifier may be coupled to the backbone. The first and second air purifiers may operate independent from each other.

A third air purifier may be supported by an upper surface of the second air purifier. The first air purifier may be detachable from the bottom support. The third air purifier may be configured to be lifted from the upper surface of the second air purifier to be separated from the docking station.

A bottom surface of at least one of the second or third air purifiers may include a flow guide to guide clean air discharged from a top of the first or second air purifiers, respectively, toward a side.

At least one of the first, second, or third air purifiers may have a circular horizontal cross-section having an area that decreases from a bottom to a top. All of the first, second, and third air purifiers may have circular horizontal cross-sections. A cross-sectional area of the third air purifier may be smaller than cross-sectional areas of the first and second air purifiers.

An air cleaning capacity of the second air purifier may have a larger air cleaning capacity than air cleaning capacities of the first and third air purifiers. The air cleaning capacity of the third air purifier may be smaller than the air cleaning capacities of first and second air purifiers.

The bottom support may include a seating groove extending from the backbone toward a front to guide a lateral slide of the first air purifier. The backbone may be inclined at an acute angle relative to the bottom support. The backbone and the second air purifier may be permanently attached to each other.

Each of the first and second air purifiers may include a case having a fan and a filter therein, a base provided below the case, and an air guide protruding downward from a center of the base, an outer side of the air guide having a concave curvature. The base may be circular.

Embodiments disclosed herein may be implemented as an air purifying system comprising a first air purifier having a fan to suction air and a filter to filter the suctioned air, a second air purifier having a fan to suction air and a filter to filter the suctioned air, and a docking station. The docking station may include a backbone extending vertically and a first support extending laterally from a bottom of the backbone. The second air purifier may be attached to the backbone. The first support may be spaced apart by a bottom of the second air purifier by a predetermined distance to create a gap. The predetermined distance may be greater than a height of the first air purifier such that the gap allows docking of the first air purifier below the second air purifier.

The first and second air purifiers may have different cubic feet per minute (CFM) values. The first and second air purifiers may be aligned vertically when the first air purifier is inserted into the gap. The first support may include a seating groove configured to guide a movement of a bottom of the first air purifier toward and away from the backbone.

A third air purifier may be configured to operate independent from the first and second air purifiers. The third air purifier may be configured to be placed on and lifted from an upper surface of the second air purifier.

The upper surface of the second air purifier may include a display and a display housing in which the display may be provided. A seating groove may be formed at an edge of the display housing. A lower surface of the third air purifier may include a seating protrusion configured to fit inside the seating groove of the second air purifier.

The second air purifier may have a larger CFM than CFMs of the first and third air purifiers. The third air purifier may have a smaller CFM than CFMs of the first and second air purifiers.

It is to be understood that the present disclosure may be embodied in many other specific forms without departing from the spirit or essential characteristics thereof. The reference of a direction may be referred to as the forward direction of the air purifying system toward which a user mainly approaches, and/or may also based on the user looking forward of or at the air purifying system. It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifying system comprising:
   a first purifier;
   a second air purifier positioned above the first air purifier;
   a docking station provided with a backbone extending in a vertical direction;
   a third air purifier supported by an upper surface of the second air purifier; and
   at least one support extending laterally from the backbone, the at least one support including a bottom support extending laterally from a bottom of the backbone,
   wherein the backbone is inclined at an acute angle relative to the bottom support,
   wherein the first air purifier is positioned on the bottom support and the second air purifier is coupled to the backbone through a case of the second air purifier, and the first air purifier is detachable from the bottom support such that the first and second air purifiers operate independent from each other, and
   wherein an air cleaning capacity of the second air has a larger air ea capacity than air cleaning capacities of the first and third air purifiers.

2. The air purifying system of claim 1, wherein a bottom surface of at least one of the second or third air purifiers includes a flow guide to guide clean air discharged from a top of the first or second air purifiers, respectively, toward a side.

3. The air purifying system of claim 1, wherein at least one of the first, second, or third air purifiers has a circular horizontal cross-section having an area that decreases from a bottom to a top.

4. The air purifying system of claim 3, wherein the first, second, and third air purifiers have circular horizontal cross-sections.

5. The air purifying system of claim 3, wherein a cross-sectional area of the third air purifier is smaller than cross-sectional areas of the first and second air purifiers.

6. The air purifying system of claim 1, wherein the bottom support includes a seating groove extending from the backbone toward a front to guide a lateral slide of the first air purifier.

7. The air purifying system of claim 1, wherein the backbone and the second air purifier are permanently attached to each other.

8. The air purifying system of claim 1, wherein each of the first and second air purifiers includes:
   a case having a fan and a filter therein;
   a base provided below the case; and
   an air guide protruding downward from a center of the base, an outer side of the air guide having a concave curvature.

9. The air purifying system of claim 8, wherein the base is circular.

10. The air purifying system of claim 1, wherein the air cleaning capacity of the third air purifier is smaller than the air cleaning capacities of first and second air purifiers.

11. The air purifying system of claim 1, wherein the third air purifier is configured to be lifted from the upper surface of the second air purifier.

\* \* \* \* \*